Dec. 22, 1964         R. D. FARKAS         3,162,561
HIGH FREQUENCY DIELECTRIC HEATING APPARATUS
Filed March 9, 1961         4 Sheets-Sheet 1
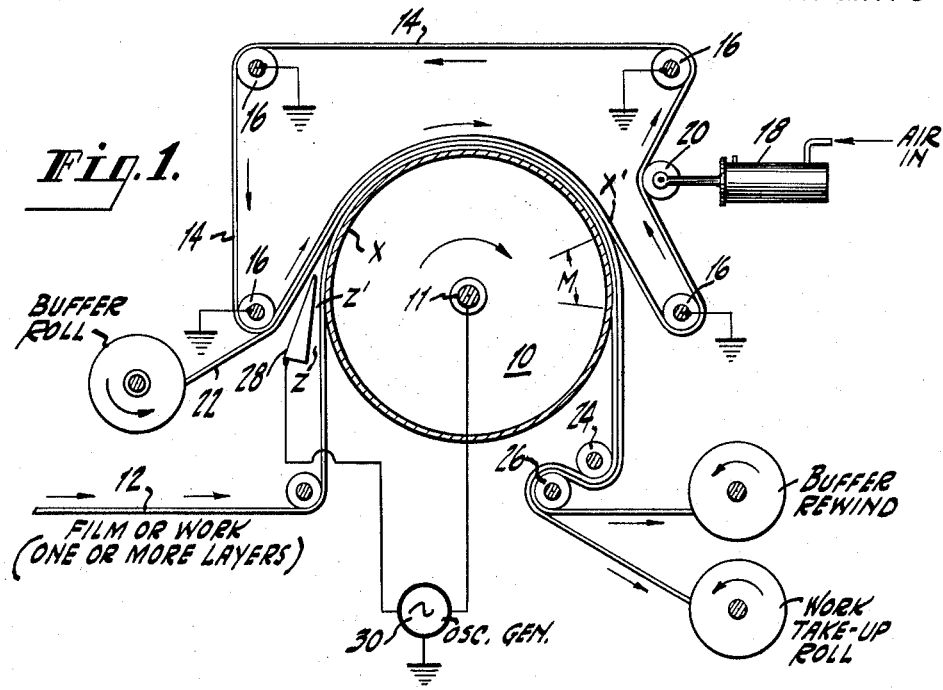
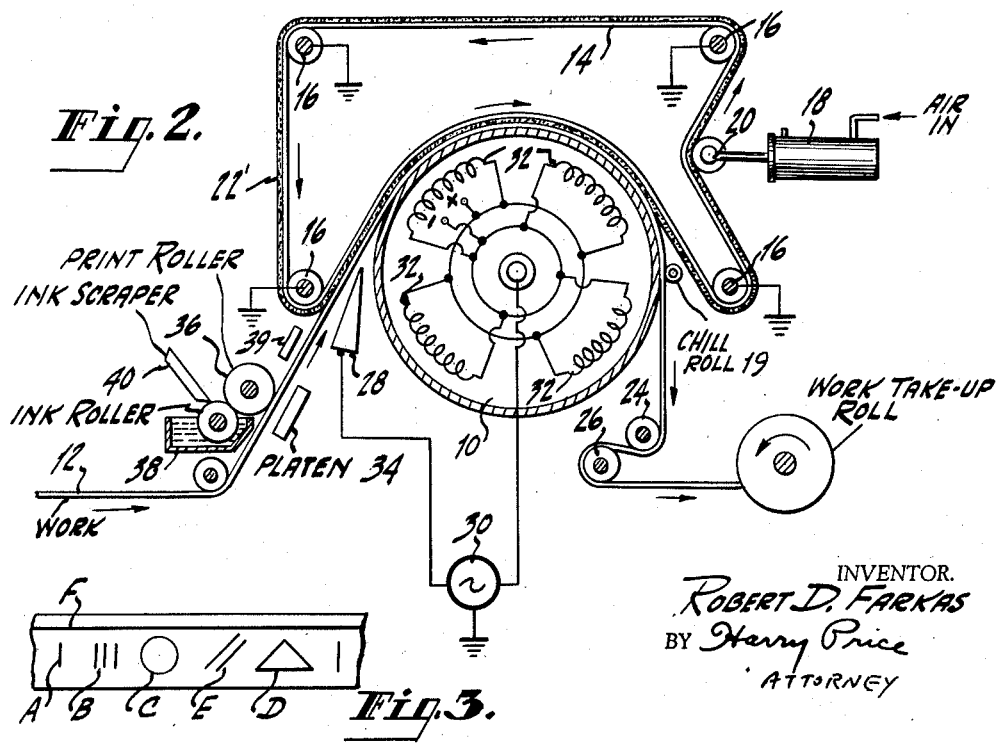
INVENTOR.
ROBERT D. FARKAS
BY Harry Price
ATTORNEY

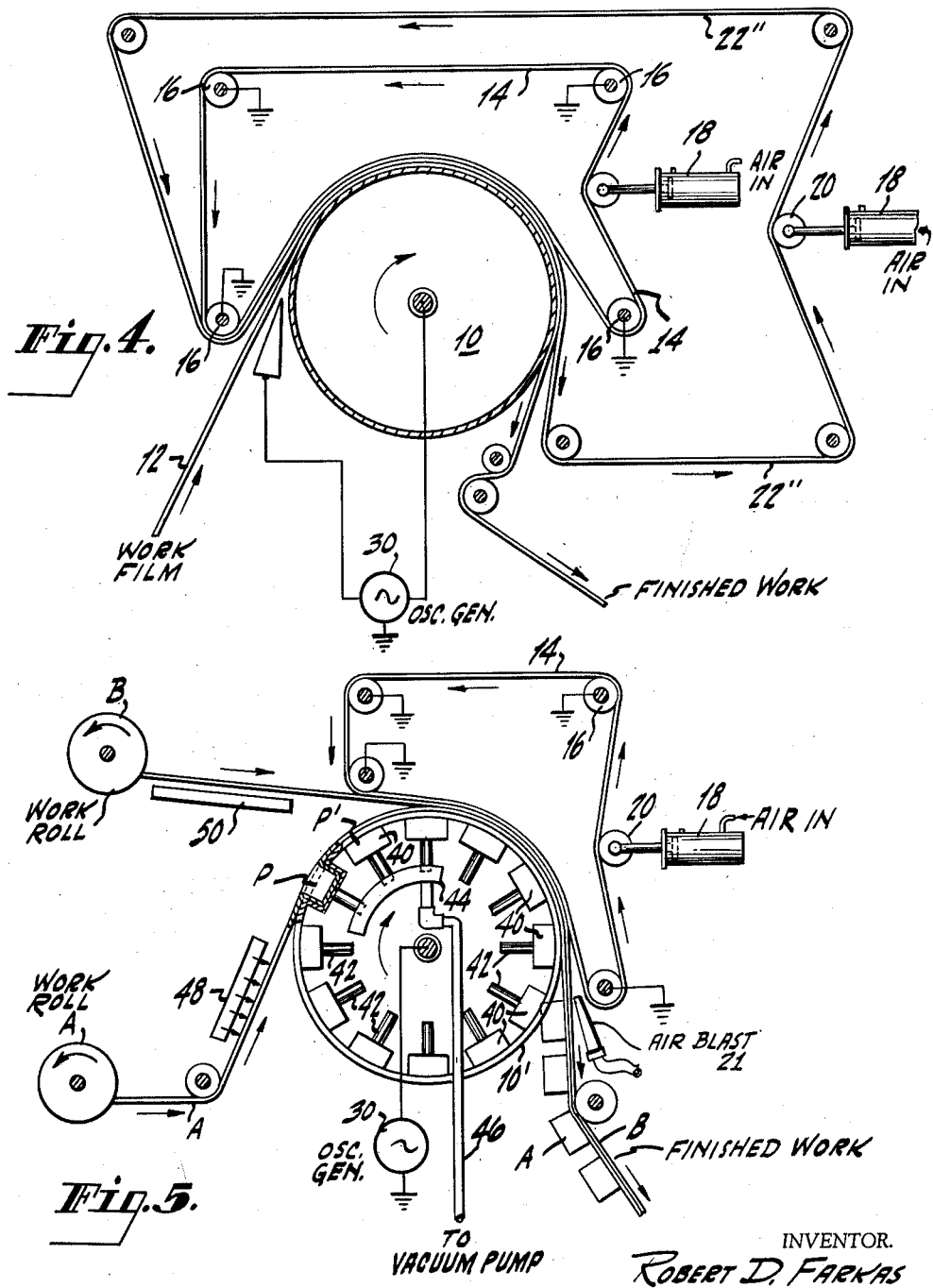

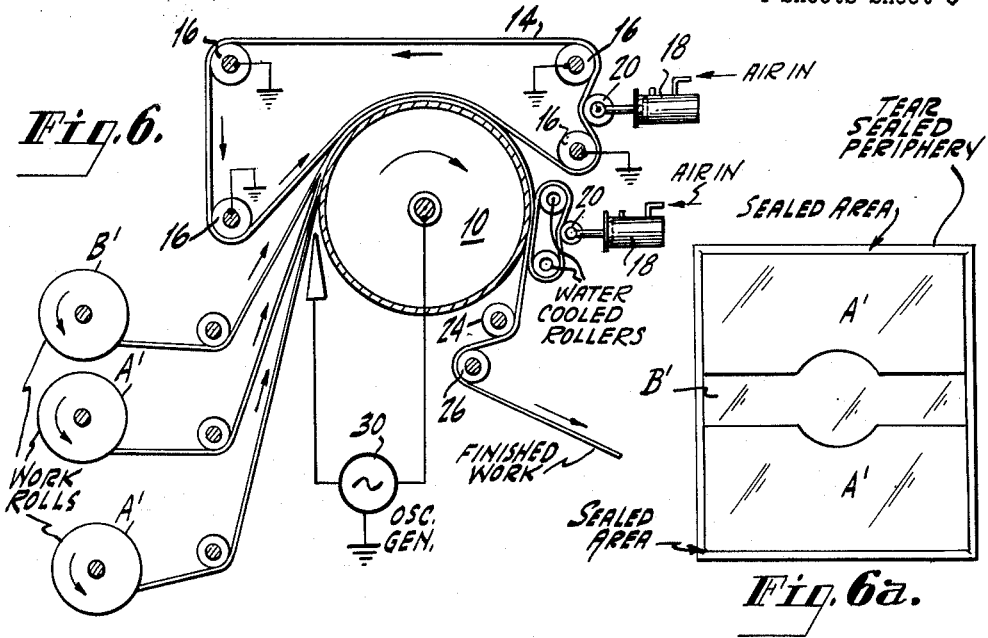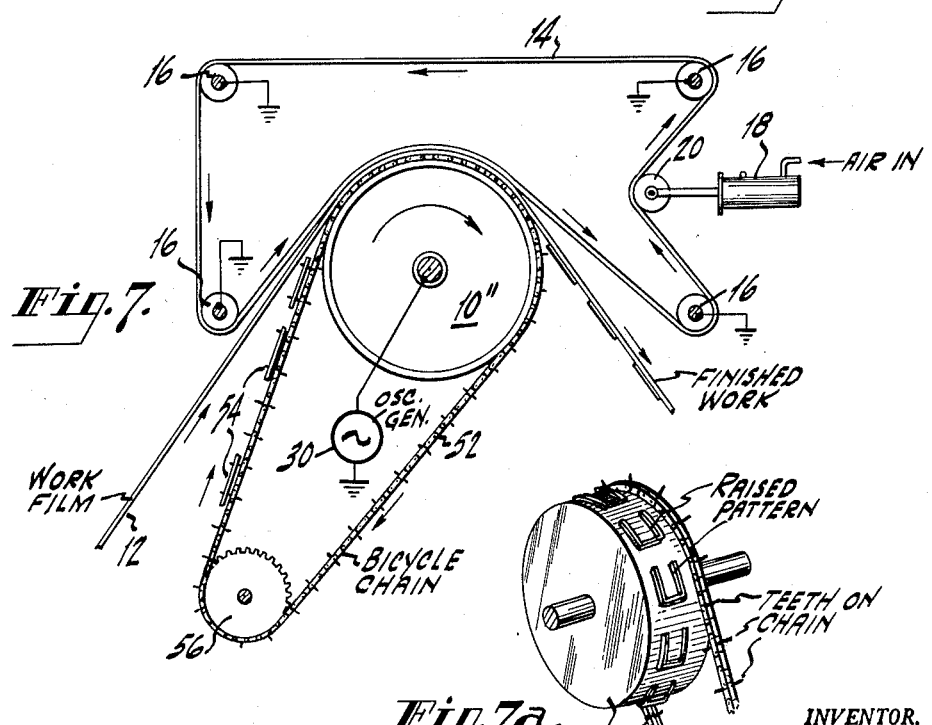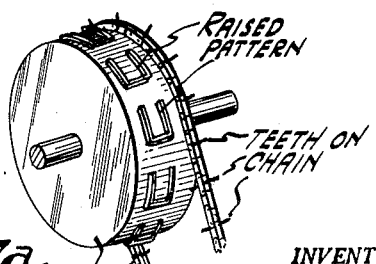

Dec. 22, 1964  R. D. FARKAS  3,162,561
HIGH FREQUENCY DIELECTRIC HEATING APPARATUS
Filed March 9, 1961  4 Sheets-Sheet 4
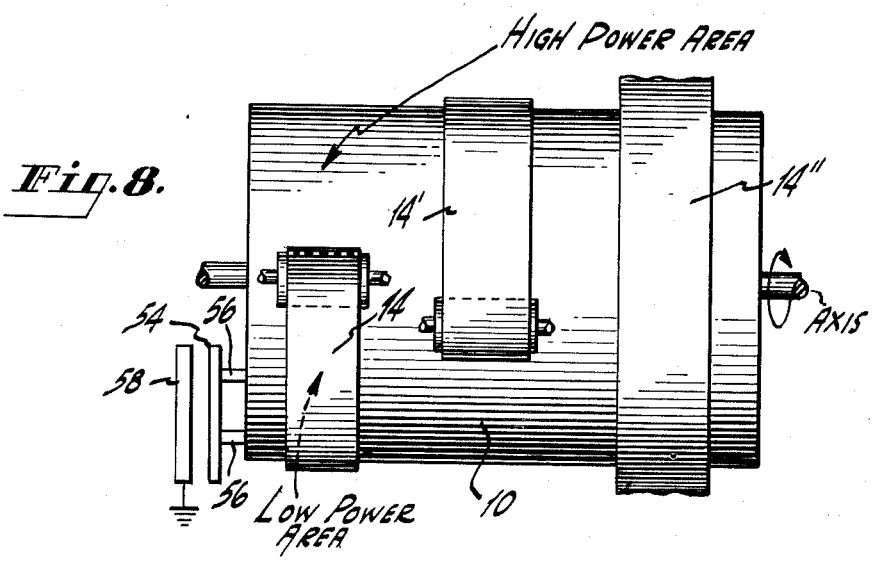
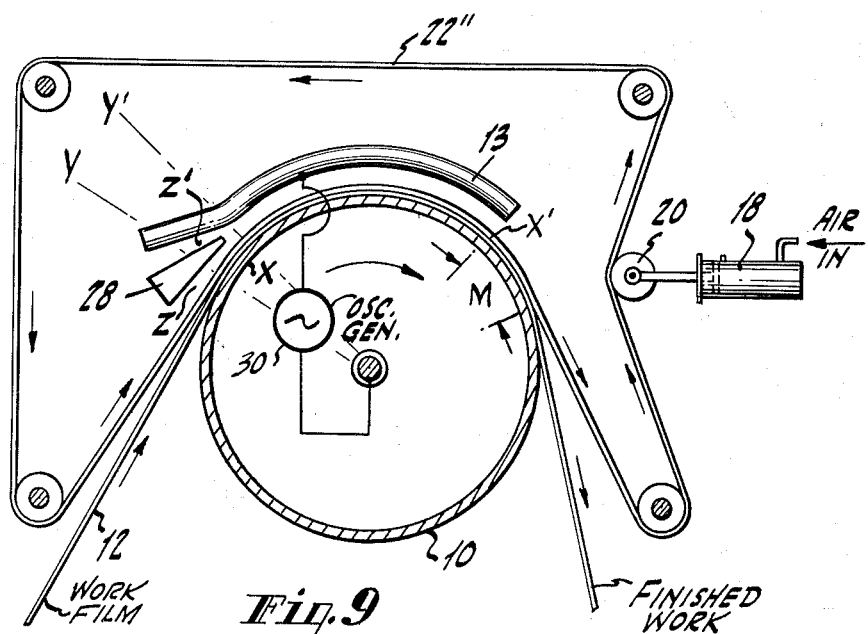
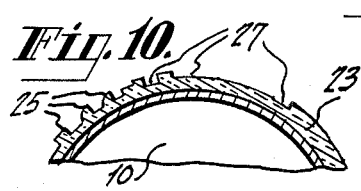
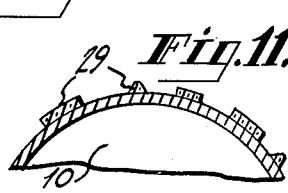
INVENTOR.
ROBERT D. FARKAS
BY Harry Price
ATTORNEY

United States Patent Office 3,162,561
Patented Dec. 22, 1964

3,162,561
HIGH FREQUENCY DIELECTRIC HEATING
APPARATUS
Robert D. Farkas, 644 Derby Ave., Woodmere, N.Y.
Filed Mar. 9, 1961, Ser. No. 94,458
26 Claims. (Cl. 156—380)

This invention relates to dielectric heat sealing apparatus for bonding together a plurality of layers, or for embossing a single layer. It is known to use machines which make use of a high frequency electric field for developing heat in the parts to be bonded or sealed together, at least one of which is a dielectric material which becomes plastic when heated to a certain temperature. The material or parts to be sealed are positioned between electrodes which are connected to a high frequency generator, which, in turn, creates between the electrodes a high frequency electric field which heats the thermoplastic material to plasticity (i.e., becomes tacky) by reason of the dielectric losses therein. This type of heat sealing using an alternating electric field and the machine parts employed to achieve an electronic heat sealing operation has been discussed by me in an article published in Modern Plastics Magazine for March 1958. In this article, I describe among other things, two types of heat sealing dies, one for accomplishing plain sealing and another for producing a tear seal which permits final tearing of the plastic film to be done by hand for severing a weakened portion of the film from the rest of the film.

Various problems arise when it is attempted to heat treat and seal one or more layers of material, particularly when it is desired to selectively weld and/or produce a tear seal in certain portions of the material.

Heretofore, some attempts have been made to seal continuously the dielectric work material by employing two wheels under pressure, driven by motors, and attempting to cool simultaneously the outside of the work while heating, utilizing a point or line contact between the two wheels. This method is limited by three basic factors: (1) Heat is induced into a dielectric work in direct proportion to time and the square of the applied voltage. Since a limit in voltage is established by the work itself, before breaking down, the time in which a material is influenced by a high frequency field determines the speed of production. For a given tolerable voltage, and work, a period of time of required high frequency heating is thus determined. Since the time of high frequency heating in a dual wheel apparatus is virtually zero, the speed of production is quite low. (2) Cooling the work by a line contact is poor since the flow of heat by conduction from one mass to another is directly related to the area of contact between them. Since a line contact has virtually zero area the cooling effects are ineffectual. Also, cooling the work during its heating period is not as effective as cooling under pressure after the heating period. (3) Gradual pre-heating prepares the thermoplastic or dielectric work to accept higher levels of high frequency energy for the duration of the welding or embossing period, since additional molecular agitation after pre-heating is easier to induce than in a material whose molecular mobility is low. Pre-heating at remote locations from the welding area is ineffective since the work is generally thin compared to its face areas as a result of which heat transfer to the air is difficult to avoid. Pre-heating can be selective as to areas which ultimately will be welded or embossed. These problems, inter alia, are overcome by the dielectric heat sealing apparatus of the present invention, which selectively makes use of one or more novel features among which are: (1) means for gradually applying power to the plastic film or work to be sealed, while the material or materials are in continuous motion; prior to the heat sealing; (2) the use of an appreciably large size conductive drum electrode which is a die wheel with a non-uniform peripheral surface having embossed (raised), engraved (depressed) or relief (3-dimensional) areas and which selectively bonds and/or produces a tear seal and/or produces embossed areas in accordance with a desired pattern, in association with another electrode either stationary and spaced from the periphery of the drum or a metallic endless belt spaced from the drum but pressed against the work therebetween over a large arc. The metallic belt serves as the other electrode for the apparatus; (3) and constructions which enable the heat-sealed material to be cooled immediately following the heat cycle while keeping the material in contact with a large relatively cool thermal mass and still under pressure. This post cooling occurs after the work has advanced beyond the zone in which heating of the work is effected by the use of the high frequency electric field.

Other features which may be used in the practice of the invention include; means for simultaneously vacuum forming and heat sealing the layers, thereby enabling pockets and cavities to be formed in the finished work and which pockets can be filled with material to be used by a consumer and severed from the sealed film to constitute individual packages; and means for printing on the one or more of the layers of work while the work is locked firmly in position, thus overcoming the problem of registry which confronts the industry where the printing is done after or before the heat sealing step.

The layers which can be sealed or bonded together by the apparatus of the invention may include one or more of the following: thermoplastic films, sheet material impregnated with a plastic binding agent, or woven or nonwoven fabrics in combination with the thermoplastic film, impregnated sheet material, or thermoplastic films of non-uniform cross-section printed or embossed. These fabrics can be laminated, or coated in various combinations prior to processing with the apparatus of the invention.

It should be understood that the foregoing novel features may be used selectively or in combination and with other features to be described hereinafter, depending upon the requirements for the apparatus and the end use to which the heat sealing apparatus is to be put.

A more detailed description of the invention follows in conjunction with drawings wherein:

FIGS. 1, 2, 4, 5, 6, 7, 8 and 9 show different modifications of the dielectric heat sealing apparatus of the invention;

FIG. 3 is an expanded view of the surface of the drum or die wheel showing several different representative designs or patterns thereon, any one or combination of which may be used in the step of heating, heat sealing, embossing and/or tear sealing layers of film or shaped material together;

FIG. 6a shows a card case which can be made by the heat sealing apparatus of FIG. 6;

FIG. 7a is an elevation view of the drum or die wheel and the chain arrangement of FIG. 7 and chain, and shows the teeth or spokes of the chain for intermeshing with the holes in the drum; and FIGS. 10 and 11 are fragmentary views of the die wheel or drum showing, by way of example only, two ways of placing a pattern on the peripheral surface of the die wheel.

Throughout the various figures of the drawing the same parts are designated by the same reference numerals.

The dielectric heat sealing apparatus of FIG. 1 comprises a cylindrical metallic drum or die wheel 10 mounted on a shaft 11 and on the periphery of which there is arranged a design or pattern in accordance with which successive parts of the flexible work or film 12 such as thermoplastic material, are to be sealed and/or tear sealed and/or embossed selectively. This peripheral surface of the die which contacts the work is thus irregular or non-uniform by reason of the shape of the pattern as contrasted with a smooth peripheral surface. The design or pattern may take any desired shape. Several of these shapes are shown, by way of example only, in the drum surface expanded view of FIG. 3. In order to subject the work 12 to a relatively long heating cycle, there is provided in cooperation with drum 10 an endless metallic belt 14 which is wound around four spaced, metallic, rollers 16. The belt 14 passes over a substantial arc $x$—$x'$ on the drum 10 and between them the work is caused to travel in the direction of the arrows while being subjected to a relatively long heat treatment. The metallic belt 14 and drum 10 both serve as electrodes, between which there is electrically coupled a high frequency oscillation generator 30, for producing a high frequency electric field of constant intensity, adequate to develop heat in the film or work 12 and other superimposed layers, when used, to be bonded together, and of sufficient intensity to render the dielectric work or film plastic or tacky when heated to a certain temperature. The metallic rollers 16 are connected to ground at their respective metallic shafts, as shown, while the metallic shaft of the drum is connected to one terminal of the oscillation generator 30 the other terminal of which is grounded to complete an electrical circuit between drum and endless belt. The die wheel or drum thus acts as the high voltage electrode, although, if desired, the connections may be reversed so as to make the belt 14 the high voltage electrode. The metallic rollers 16 and the drum 10 may be driven simultaneously by means of a motor and suitable linkages connected to their respective shafts. The arrows indicate the directions of motion.

An air cylinder 18 has its piston linked to the shaft of an idler roller 20 so as to apply pressure to the belt 14, as a consequence of which the belt supplies pressure on the thermoplastic work film 12 (and superimposed layers to be bonded, when used) and on the drum 10 through the work. Obviously, the pressure on the work can be varied by varying the air pressure fed to the air cylinder 18.

A buffer in the form of a film or web 22 of insulation is introduced between the metallic endless belt 14 and the work 12 over the arc of the drum over which the work and belt pass. This buffer web has a high temperature strength and a high voltage break-down characteristic and is flexible so as to follow the overall peripheral surface of the drum. The buffer web serves (1) to thermally insulate the heat generated in the work 12 of thermoplastic material from the metal belt, (2) relieve mechanical irregularities in the belt, in the drum surface and in the plastic film, and (3) insures that pressure is maintained on the heated areas over an arc M after the plastic work 12 leaves the heating zone $x$—$x'$. Thus, the finished work is cooled over the arc M while it is under pressure.

After the work 12, now sealed, tear sealed, or embossed, in accordance with a desired pattern on the peripheral surface of the drum 10, and the buffer web 22 leave the drum, they pass over a driven roller 24 and an idler roller 26 and are wound up or collected separately on rolls, as shown.

In order to apply power gradually to the work 12, as it advances to meet the drum, there is provided a shaped electrode 28 which is tapered and oriented approximately tangentially to the drum periphery, as shown. Electrode 28 can be maintained at a higher A.C. voltage than the drum 10 so as to cause a high voltage field to be created between them. The intensity of the voltage between electrode 28, and drum 10 is thus greater than that between drum 10 and belt 14. Because the distance between the electrode 28 and the high voltage drum electrode 10 is greater in the zone Z than in the zone Z′, the radio frequency dielectric field at Z is weaker than the field at Z′. A voltage gradient is thereby produced in the work 12 such that the power builds up slowly in the plastic 12 which is thus warmed-up before it engages the belt 14, as a result of which the work 12 can accept more power than if the power were applied to work 12 in a cold condition by the drum 10 and belt 14. This slow power build up may be referred to as "step-starting," and occurs selectively only in the zone or area where embossing, sealing or tear sealing will later take place. The high frequency field in the work caused by the electrode 28 has a greater intensity on the outer surface of the wheel 10 than on the inner surfaces of the design or pattern in the face of the die wheel. The source for high frequency energy for pre-heating need not be the same as that used for the welding, embossing or tear sealing. A separate high frequency producing means may be employed, and if desired, it may operate at a higher frequency than the welding or sealing high frequency apparatus, thus allowing for a lower voltage than that used on the driven element 28 in the arrangement shown.

The design or pattern on the periphery of the drum or wheel 10 may take any one or more of the shapes shown in FIG. 3, as illustrative only. These may have embossed, engraved or 3-dimensional relief surfaces. The transverse raised line or metallic edge A may be a line comprising a plain seal, continuous or interrupted, a tear seal continuous or interrupted, or a plain seal line in which some areas of the seal line have been removed so as to simulate stitching. One of the raised metallic edges or lines of B can be a continuous or interrupted weld line, another can be a tear seal line, continuous or interrupted, and the last a combination of the previous two. The closed circular and triangular configurations C and D may be plain seal and/or tear seal combinations, continuous or interrupted. This also holds true of the slanted raised edges E which need not be straight. These designs may be for decorative and/or utilitarian purposes. Horizontal line F represents any continuous area (seal or tear or embossed) which may extend completely around the periphery of the drum. The seal edge is on one level while the tear seal edge is on another level. The difference between an ordinary seal and a tear seal is described in my aforesaid article in the Modern Plastics Magazine.

When a die contacts the work during a heat sealing operation in order to insure a weld or seal at the interface of any two layers being sealed or fused together and to increase the weld strength of the layers, a bead of molten plastic is squeezed out from under the die face area. It is imperative that this bead be allowed to form. Consequently, any face or element of the die which is not used for welding should not be allowed to contact the work and should be sufficiently removed or resiliently constructed to permit the plastic bead to form. Where a buffer is used, suitable precautions must be taken to allow the bead to form. In some embodiments of the present invention, since the die face is the only contacting surface in the heat-sealed areas, cooling is effected only in these areas while the work is under pressure. When plastic is extruded, the die faces must approach each other while pressure thereon is being maintained. Since the process of heating and extruding the bead is not a linear function of time, the electrode proximity should be compliant with this non-linear process; that is, the contacting faces of the electrode must be capable of closing the distance between them in a non-linear fashion dependent upon the dielectric work material and die characteristics.

The modification of FIG. 2 differs from that of FIG. 1 in the following respects: the buffer of FIG. 1 as a separate web is dispensed with and replaced by a buffer coating of insulation 22′ bonded to the exterior surface of the metallic belt 14; the drum 10 is heated in the interior by any suitable means such as the electric heaters 32 similar terminals of which are shown connected in parallel to a source of voltage supply; and a chill roll 19 is provided for post cooling the work after it has advanced beyond the high frequency electric field heating zone, and while the work is still under pressure. This heating of all or parts of the peripheral surface of the drum is useful for applique, and deep embossing effects and also to improve the speed of operation as required; and a printing mechanism is provided to insure printing on the work while the plastic film or work is locked firmly in position and is advancing. The printing mechanism includes a flat platen 34 on the side opposite the print roller 36. The roller 36 engages an ink roller, in turn, partly immersed in an ink bath 38. A doctor blade or ink scraper 40 serves to remove excess ink from the ink roller. The distance between print roller 36 and the point of contact with the buffer 22' is sufficient to allow the ink to dry or set with or without external heat from a heat source 39. This feature overcomes the problems of registry which exist in conventional arrangements where the printing or silk screening is done after or before the heat sealing step. This printing technique can be applied to other work webs fed into the apparatus simultaneously, and to one or both surfaces of one or more layers of work. The electrode 28 in FIG. 2 is opsitioned to act on the work by a field between the electrode 28 and the grounded belt 14 as opposed to the arrangement of FIG. 1 wherein electrode 28 acts on the work with drum 10 thus providing overall gradual pre-heating of the work close to the drum sealing arcuate portion.

The dielectric heat sealing apparatus of FIG. 4 is similar to those of FIGS. 1 and 2 except that the buffer web 22" is made in the form of an endless band of insulation which travels over spaced driven rollers. Such an arrangement assures that pressure is maintained on the unheated finished work over an arc on the drum after the sealed finished work has left the heating zone and is cooling off. The electrode 28 functions in a manner similar to that of FIG. 2 to provide gradual overall pre-heating of the work.

The dielectric heat sealing apparatus of FIG. 5 provides individually packaged and sealed products, and also can be used to provide a web, continuous in nature, which has pockets or blisters useful for purely decorative, or functional, purposes in discrete or continuous lengths. The drum 10' is shown in cross-section and is provided with cavities or pockets 40 on its peripheral surface, each pocket communicating by a duct 42 to a pressure differential system such as a sequentially operative vacuum manifold 44 which, in turn, is coupled to a vacuum or exhaust pump by a tube 46. Two work rolls A and B of thermoplastic film material, are fed to the drum in such a way that one film is superimposed on the other. A heat source 48, either thermally radiant, conductive or convective, or one which makes use of a high frequency generator driving a stray field electrode serves to pre-warm the work film A before it reaches the drum 10'. A heat insulation plate 50, if required, prevents this heat source from heating the film B as it advances toward the drum. The vacuum manifold functions to provide suction on one or more cavities 40 at a time, but successively on all cavities, as they individually reach a predetermined point P on the drum. The heated film A is drawn into the cavity at point P and provides a pocket which is later sealed or tear-sealed around the pocket, if desired, to the film B in the area of pressure contact of belt 14 through the work on die drum 10'. Upon contact with the cavity or pocket, the formed film A is cooled by reason of temperature differential between pre-warmed film A and the cooler drum or die wheel. This cooling occurs before and during and after the heating of the material by the high frequency field. By inserting any suitable product in the formed pocket at point P' the apparatus thus provides individual packages which can be severed from the finished heat sealed work, if desired. Also, if desired, more than one work film can be used superimposed in the place of either work film A and B or for both work films A and B. The buffer film of insulation has not been shown in FIG. 5 in the interest of simplicity of illustration, but it should be understood that such a buffer film is preferably employed in any one of the forms shown in FIGS. 1, 2 or 4. An air blast 21 is provided for post cooling of the work while it is still under pressure against the drum.

The finished work of FIG. 5 need not be provided with a product inserted into the cavities, in which case the 3-dimensional finished work will be comprised of the cavity or pocket-formed layer A covered by one or more flat layers B. The roll B shown in FIG. 5 may represent one or more layers. In this event, the finished work may be used for purely decorative purposes, or serve utilitarian purposes such as a mat having locked-in spaced air pockets. Such a mat, for example, may be used at the beach or as a float in the water.

The embodiment of FIG. 6 is useful, by way of example, for the manufacture of card cases for wallets. The plastic film from a pair of work rolls A' placed side-by-side advance together with the backing film from another work roll B'. The film B' is wider than either film A' and covers both side-by-side films A' and is heat sealed to them by the apparatus. By way of example only, the films A' may be clear and transparent plastic and have previously prepared finger cut-out portions, while the film B' may be a colored (brown, black or tan) plastic. The pattern or design on the drum should, of course, be such as to heat and tear-seal the superimposed layers or films at desired locations. A metallic endless belt arrangement having water-cooled rollers provides the desired post-cooling of the work while the work is under pressure. The finished product is shown in FIG. 6a.

The dielectric heat sealing apparatus of FIG. 7 is useful for combining together discrete parts in bonded relation. For this purpose there is provided a traveling endless narrow chain 52, such as an insulated bicycle chain, driven from roller 56 and having teeth or probes suitably spaced and provided along one edge thereof for meshing with similarly spaced holes along one edge of the metallic drum 10". Some of the teeth which extend transversely of the chain extend beyond the chain in opposite directions. The discrete parts to be sealed are shown as 54 and are placed on the chain at suitable locations, in desired physical relation to the adjoining teeth on the chain on those selected teeth which extend above the chain. If desired, the discrete parts to be bonded may be superimposed on one another so as to achieve proper registry of the parts to be bonded together, to themselves, and/or to the advancing work 12. In the event that a metallic chain is utilized, without an insulating coating it is preferred that the wheel 10" be grounded and the rollers 16 connected to the high voltage terminal of generator 30 (in other words, a reversal of polarity) in the interest of safety.

The 3-dimensional die pattern on the peripheral surface of drum 10" is shown in FIG. 7a, by way of example only. It should be understood that the buffer coating, film or web may also be incorporated, if desired, in the apparatus of FIG. 6 in the same manner as shown in FIGS. 1, 2 and 4.

FIG. 8 is a plan view of the high frequency dielectric heating apparatus of the type shown in any one of FIGS. 1, 2, 4, 5, 6 and 7, with the exception that there are provided a plurality of metallic endless belts 14, 14' and 14" similar in arrangement and support thereof to the endless belt 14 of the apparatus shown in the other figures but spaced or displaced from one another along the width of the die drum 10 and adapted to engage different arcuate portions of the metallic drum. It may also be desired to utilize a plurality of spaced belts arranged successively, that is, one following the other, and occupying different arcuate portions of the metallic drum over the circumferential length of the same circle. Only that fragmentary portion of the apparatus has been shown in plan view which is necessary for an understanding of the modification described. The peripheral surface of the drum may be prepared with a design or pattern composed of elevated and recessed surfaces of complex nature so that a plurality of metallic belts can selectively utilize different patterns or portions thereof for sealing, tear sealing, or embossing the work, as desired.

The repeat pattern or design on the peripheral surface of the die wheel or drum 10 may in some cases be small compared to the total heated length of the work over arc x—x' on the drum. Constant level power can then be employed at all times. If, however, the small repeat pattern is not feasible by reason of the nature of the desired finished product and the phyhical dimensions of the die wheel, then a distributed capacity, employed on some areas of the die wheel would off-set or decrease the amount of available power where the power required is less by virtue of the die pattern configuration being smaller in these areas compared to other areas. The distributed capacity technique where less power is required is achievable by a shallow relief die or a metallic plate added to the side of the metallic die wheel at the location where less power is required, and in juxtaposition with a ground plate selectively placed parallel to the end of the die wheel. Such an arrangement is shown in FIG. 8 wherein metallic plate 54 is mounted on the die wheel 10 by means of metallic studs 56 on one side of the wheel. Plate 54 is capacitively coupled to the metallic plate 58 which is connected to ground. As the wheel revolves with plate 54, the effect produced by plate 54 being periodically positioned adjacent plate 58 is similar to a condenser of periodically varying capacitance. A low power area on the drum is adjacent the distributed capacity plate 54 while a high power area is located away from the distributed capacity.

This distributed capacity feature may, of course, be incorporated in any one of the heating apparatuses shown in FIGS. 1, 2, 4, 5, 6, 7 and 9, in the same manner as shown in FIG. 8. This feature need not consist of a single plate 54 having a uniform length in the direction of the radius. Shaping plate or plates 54 to engage with one or more plates 58 will control the power level of the high frequency electric field as drum 10 rotates, when used with a dielectric heat sealing generator whose output potential can be varied through the use of distributed capacity.

The dielectric heating apparatus of FIG. 9 differs from those shown in the other figures mainly in the use of a stationary shoe electrode 13 which replaces the endless metallic belt electrode of FIGS. 1, 2, 4, 5, 6, 7, 8 and 9. This shoe electrode is slightly spaced from the metallic periphery of die wheel or drum 10 and provides an air gap therebetween to permit, inter alia, the entry of the work 12 and a driven buffer web or belt of insulation 22". The shoe electrode follows the contour of the drum periphery, except for zone Y—Y' which may be used as a gradual power build-up area in the advancing work either with or without using the technique requiring an electrode 28 as shown in FIG. 1 to provide selective gradual preheating of the work. If the electrode 28 is not employed then the gradual power build up can be produced in the zone Y'—Y' by virtue of the shoe portion departing from the shape of the contour of the wheel and causing a non-uniform high frequency field such that the heating rate increases from Y to Y'. Heating of the work is accomplished through the air gap and through the plastic work confined on the peripheral surface of the die wheel or drum. The driven buffer web presses the work firmly against the drum as the drum and web advance together with the work. Pressure on the work over the arcuate zone M is maintained by the buffer web after the work leaves the heating zone defined by x—x' on the drum and is cooling.

An advantage of the apparatus of FIG. 9 is a reduction in the cost of the apparatus compared to one using an endless metallic belt as an electrode. Threading of the work is also easier with the apparatus of FIG. 9.

It should be understood that the dielectric heating apparatus of the invention shown in FIGS. 1, 2, 4, 5, 6, 7, 8 and 9 may use one or more of the features described hereinabove in combination or selectively for the purpose of fabricating a specific product. Thus, by way of example, the apparatus of FIG. 8 may incorporate either the selective or the overall gradual work pre-heating feature involving the voltage gradient shown in FIGS. 1, 2, 4 and 6, the printing mechanism of FIG. 2 on one or more work rolls associated with one endless belt of FIG. 8, the vacuum forming feature of FIG. 5, and the discrete work segment aspect of FIG. 7 associated with another endless belt of FIG. 8, and the concept of a plurality of narrow work webs as shown in FIG. 6, in association with the third endless belt of FIG. 8. Any or/all of the endless belts of any of the FIGS. 1, 2, 4, 5, 6, 7 and 8 can be replaced by a stationary electrode shoe as shown in FIG. 9, provided that the pressure on the work is maintained by a buffer web. The drum surface heating feature of FIG. 2 can be incorporated on the whole or on part of the drum periphery of the other modifications. The buffer web of insulation of FIGS. 1, 2 or 4 can be used in any one of the systems of FIGS. 5, 6, 7 or 8. The gradual overall pre-heating feature of FIG. 2 may be used in the apparatus of FIG. 9.

The frequency of the oscillation generator may be anywhere in a wide range; for example, a range of 10 megacycles per second to 150 megacycles, and the amount of power supplied to the work will depend upon such factors as the thickness and nature of the work and the operation to be performed thereon whether it be embossing, plain or tear sealing, and their respective areas, the number of layers of work to be sealed, the duration of the heating step, etc. This power supplied to the work may be in the range of ¼ kilowatt to 50 kilowatts and higher.

The pattern on the peripheral surface of the metallic die wheel can be formed by removing sections of the peripheral surface, or by adding sections, metallic or otherwise, to the peripheral surface. FIG. 10 shows how a pattern is provided on the metallic die wheel 10 by attaching to the periphery a continuous insulating or metallic layer 23 having raised segments 25 and cut out or depressed portions 27 arranged in a predetermined design. FIG. 11 shows how individual segments 29 of insulation or metal can be attached to the metallic peripheral surface of die wheel 10 to form the desired pattern. Any one of these arrangements or combinations thereof is capable of intensifying or decreasing the pressure and electric field strength in desired areas of the work, thereby causing selective areas of the work to be sealed or impressed with a particular design. If, desired, a pattern can be constructed by non-uniform thicknesses in the buffer web or by the addition of metallic elements to the buffer web.

Wherever possible the cut out or removed areas, or the added segments of the metallic pattern should not be filled with insulation in order to conserve power and prevent possible distortion of the work due to heating in the insulation. Any insulation material other than air has a loss factor higher than air and a dielectric constant greater than one with an attendant loss of power due to stray heating of the dielectric at a higher level, due to the higher dielectric constant. When it is desirable to prevent the work from collapsing into the cavities or depressed areas below the die face, two precautions should be observed: (1) Allow an appreciable air gap below the innermost surfaces of a thin insulating layer located within the depressed areas and the bottom surfaces at the die wheel or drum cavities, thus reducing losses, (2) support the insulation slightly below the die face and on some resilient base to permit inward displacement at the insulation by the work, thus allowing for the die surface or face to embed itself into the work.

The term "pattern" used in the appended claims is deemed to include raised and/or depressed and/or 3-dimensional surfaces on the surface of an electrode whether the pattern is used for decorative purposes by making an impression on the work or for heat sealing the work for a functional purpose.

In one embodiment of the invention successfully tried out, the high frequency generator operated at 18 megacycles and supplied power at ten kilowatts to the apparatus for bonding together two layers of polyvinyl chloride thermoplastc sheet material each having a thickness of .008 inch. The buffer web was a gray electrical fish paper of a thickness of about .014 inch. The finished work had a pattern impressed thereon which included continuous and intermittent: tear seals, plain seals and unsealed areas. The same apparatus was used satisfactorily to bond together two layers of .014 inch of polyvinyl chloride thermoplastic material. In both cases, the peripheral speed of the work on the drum was about five hundred inches per minute.

What is claimed is:

1. Dielectric heating apparatus for heating a dielectric work during the feeding of the work, comprising a die wheel having a nonuniform metallic periphery upon which there is a pattern to be impressed on said work, said metallic periphery constituting one electrode of said apparatus, a flexible endless metallic belt adapted to press against a substantial arc on said periphery, said belt being spaced from said periphery to permit the insertion of said work between said belt and periphery over the length of said aforesaid arc, said belt constituting the other electrode of said apparatus, means for exerting pressure on one of said electrodes to cause said belt and the periphery of said wheel to press tightly against opposite sides of the work, a high frequency generator coupled between said electrodes for producing a high freqeuncy electric field therebetween of sufficient intensity to heat the work to plasticity and to impress said pattern on said work during the time said work is continuously advancing over said die wheel, means for cooling the work under pressure while it is on the periphery of the wheel and after it has been heated, and means for gradually building up electric field intensity in said work before the work enters the space between said electrodes.

2. Electrical apparatus for heating a flexible dielectric work during the feeding of said work, comprising a metallic die wheel having a nonuniform peripheral surface constituting a pattern having areas of different heights, a driven flexible endless metallic belt adapted to press against a substantial arc on the peripheral surface of said die wheel, said belt being spaced from said die wheel to permit the insertion of said dielectric work between said belt and wheel, means for causing said belt to press down on said work and wheel, means for setting up a high frequency electric field between said wheel and belt during the time said work is continuously advancing with movement of said die wheel, and means physically spaced from the wheel and the work and located near the point of entry of said work into the space between said belt and die wheel for producing a high frequency voltage gradient in said work and along a portion of the length thereof.

3. Electric apparatus for heating a relatively thin dielectric work in the form of a flexible material, comprising a metallic die wheel having on the peripheral surface thereof a pattern to be impressed on said work, a flexible endless metallic belt adapted to press against a substantial arc on the peripheral surface of said die wheel, said wheel and belt constituting electrodes for said apparatus, said belt being spaced from said die wheel peripheral surface to enable the insertion of said work between said belt and wheel for at least the length of said arc, means for exerting pressure on one of said electrodes to cause said belt and peripheral surface of said wheel to press tightly against each other with the work between them, and a high frequency generator coupled between said electrodes for producing a high frequency electric field therebetween of sufficient intensity to heat the work to plasticity during the time said work is continuously advancing over said die wheel, said peripheral surface by reason of the pattern thereon constituting an irregular surface and acting as a seal die, a buffer layer of thermal insulation between said work and one of said electrodes, and means for cooling said work under pressure while it is on the wheel and after it has been heated, said electric apparatus including means for driving said endless belt and said die wheel, said buffer thermal insulation material being positioned adjacent said belt and between said belt and said work and which buffer is capable of moving with motion of said belt and wheel, and means for causing said buffer insulation to follow the contour of said peripheral surface for a substantial arc beyond the point where the work leaves the die wheel, thereby assuring continued pressure on the heat-sealed work for a distance after said work leaves the high frequency heating zone of said apparatus, said buffer insulation having high temperature strength and high voltage break-down characteristics, said buffer being an endless belt wrapped around driven rollers, there being means provided for exerting pressure on said buffer belt to cause the belt to press against said work and wheel.

4. Electrical apparatus for heating a dielectric work in the form of thermoplastic material, comprising a metallic die wheel, a flexible endless metallic belt adapted to press against a substantial arc on the peripheral surface of said die wheel to permit the insertion of said dielectric work between said belt and wheel, means for causing said belt to press down on said work and wheel, means for setting up a high frequency electric field between said wheel and belt during the time said work is continuously advancing with movement of said die wheel, and means physically spaced from the wheel and the work and located near the point of entry of said work into the space between said belt and die wheel for producing a voltage gradient in said work and along a portion of the length thereof, said last means comprising an electrode positioned between the belt and the work and the peripheral surface of the wheel but physically spaced therefrom, one end of said electrode being closer to said work and wheel than its other end, and means for maintaining a voltage between said last electrode and die wheel.

5. Dielectric heating apparatus for heat sealing together two superimposed dielectric work parts, comprising a die drum having a metallic peripheral surface in which there are spaced pockets, a flexible endless metallic belt adapted to press against a substantial arc on said peripheral surface, said belt being spaced from said peripheral surface to permit the insertion of a plurality of work parts between said belt and said peripheral surface over the length of said arc, a pressure differential means communicating with said pockets for selectively displacing into said pockets areas on one work part lying on said drum above said pockets from other areas of said work part, means for feeding said work parts in superimposed relation over said peripheral surface and between said surface and said endless belt, pressure exerting means for causing said endless belt and peripheral surface to press tightly against each other with the work parts between them, and a high frequency source of power coupled between said metallic belt and said peripheral surface for creating a high frequency electric field therebetween during the entire time that said dielectric work parts are advancing with movement of said die drum, for selectively sealing said work parts together at points around said displaced areas.

6. Dielectric heating apparatus as defined in claim 5, including means for pre-heating the dielectric work part which is adapted to directly contact the peripheral surface of the die wheel.

7. Electrical apparatus for heating a flexible dielectric work during the feeding of said work, comprising a metallic die wheel, a flexible endless metallic belt adapted to press against a substantial arc on the peripheral surface of said die wheel, said belt being spaced from said die wheel to permit the insertion of said dielectric work between said belt and wheel, means for causing said belt to press down on said work and wheel, means for setting up a high frequency electric field between said wheel and belt during the time said work is continuously advancing with movement of said die wheel, means physically spaced from the wheel and the work and located near the point of entry of said work into the space between said belt and die wheel for producing a voltage gradient in said work and along a portion of the length thereof, and means for printing on said work before it enters the space between said wheel and belt and while the work is advancing with movement of said wheel.

8. Dielectric heat sealing apparatus for heat sealing a dielectric work during the feeding of said work, comprising a die wheel having a metallic peripheral surface, a flexible endless metallic belt adapted to press against a substantial arc on said surface, said belt being spaced from said surface to permit the insertion of said work between said belt and surface over the area of said arc, said surface and belt constituting electrodes for said apparatus, means for exerting pressure on one of said electrodes to cause said belt and said surface to press tightly against each other through said work, said wheel having along one edge spaced holes, an endless chain wrapped around a roller spaced from said wheel and also wrapped around said wheel at said one edge, said chain having spaced teeth corresponding in position to the holes in said wheel and passing over said edge to cause said teeth to register with said holes, whereby said chain can support and carry said work into the space between said belt and die wheel, and means for creating a high frequency electric field between said die wheel and said metallic belt during the time said work is advancing with movement of said die wheel.

9. Dielectric heating apparatus for heating a work film to plasticity and sealing same to another superimposed film during the feeding of said work, comprising a die wheel having a metallic peripheral surface upon which there is a pattern, said peripheral surface constituting one electrode of said apparatus, another electrode spaced from and extending over a substantial arc on said peripheral surface, the spacing between said electrodes being sufficient to permit the insertion of said work therebetween, said other electrode generally conforming to the circular contour of said wheel, a buffer web of thermal insulation of high temperature strength and high voltage breakdown and which exerts pressure on said work film to force the work film against said wheel over at least the length of said arc, means for revolving said die wheel and advancing said work, and a high frequency generator coupled between said electrodes for producing a high frequency electric field therebetween and through said work film during the entire time said work film is advancing, and at a constant potential in the areas to be sealed independently of the temperatures of the films, said pattern being irregular and adapted to contact said work film.

10. Dielectric heating apparatus for heating a work to plasticity during the feeding of said work, comprising a die wheel having a metallic peripheral surface upon which there is a pattern having areas of different elevation, said peripheral surface constituting one electrode of said apparatus, another electrode which is stationary and spaced from and extending over a substantial arc on said peripheral surface, the spacing between said electrodes being sufficient to permit the insertion of said work therebetween, said other electrode generally conforming to the circular contour of said wheel, a buffer web of thermal insulation of high temperature strength and high voltage breakdown and which exerts pressure on said work to force the work against said wheel over at least the length of said arc, means for revolving said die wheel and advancing said work, and a high frequency generator coupled between said electrodes for producing a high frequency electric field therebetween and through said work during the entire time said work is advancing, said web of insulation being endless and passing between said electrodes and over said work.

11. Dielectric heating apparatus for heating a work to plasticity during the feeding of said work, comprising a die wheel having a metallic peripheral surface upon which there is a pattern having areas of different elevations, said peripheral surface constituting one electrode of said apparatus, another electrode which is stationary and spaced from and extending over a substantial arc on said peripheral surface, the spacing between said electrodes being sufficient to permit the insertion of said work therebetween, said other electrode generally conforming to the circular contour of said wheel, a buffer web of thermal insulation of high temperature strength and high voltage breakdown and which exerts pressure on said work to force the work against said wheel over at least the length of said arc, means for revolving said die wheel and advancing said work, and a high frequency generator coupled between said electrodes for producing a high frequency electric field therebetween and through said work during the entire time said work is advancing.

12. Dielectric apparatus as defined in claim 11 including means for cooling said work after said work has passed beyond said arc.

13. Dielectric heating apparatus for heating a work to plasticity during the feeding of said work, comprising a die wheel having a metallic peripheral surface upon which there is a pattern, said peripheral surface constituting one electrode of said apparatus, a plurality of other electrodes spaced from one another along the longitudinal dimension of said peripheral surface and adapted to cover different portions of the die wheel, said plurality of other electrodes being spaced from said peripheral surface to permit the insertion of said work between them and said surface, means exerting pressure on said work to force it against said peripheral surface, means for revolving said die wheel and advancing said work, and means for simultaneously producing at any one instant regularly and periodically different high frequency electric fields between said wheel and each of said plurality of electrodes.

14. Dielectric heating apparatus as defined in claim 5, including means for preheating said one work part before it engages said die drum, and cooling said one work part during and after the heat produced by said high frequency electric field, said presssure differential means being a vacuum system which withdraws the air from said displaced areas.

15. Dielectric heating apparatus as defined in claim 5, including means for preheating said one work part before it engages said die drum, said pressure differential means being a vacuum system which withdraws the air from said displaced areas, and means for cooling said one work part under pressure before, during and after the sealing operation.

16. Dielectric heat sealing apparatus for heat sealing together dielectric work parts, comprising a die wheel having a metallic peripheral surface upon which there is a pattern having areas of different elevation, a flexible endless metallic belt adapted to press against a substantial arc on said surface, said belt being spaced from said surface to permit the insertion of said work parts between said belt and surface over the area of said arc, said surface and belt constituting electrodes for said appartus, means for exerting pressure on one of said electrodes to cause said belt and said surface to press tightly against each other through said work parts, means for introducing said work parts in a predetermined side-by-side relationship to each other between said belt and wheel, and means for creating a high frequency electric field between said die wheel and said metallic belt during the time said work parts are advancing with movement of said die wheel for heating said parts, and means for cooling said parts after they have been heated.

17. Dielectric heating apparatus for heating a work film to plasticity and sealing the same to another superimposed film during the feeding of said work, comprising a die wheel having a metallic peripheral surface upon which there is a pattern, said peripheral surface constituting one electrode of said apparatus, another electrode spaced from and extending over a substantial arc on said peripheral surface, the spacing between said electrodes being sufficient to permit the insertion of said work therebetween, said other electrode generally conforming to the circular contour of said wheel, a buffer web of thermal insulation of high temperature strength and high voltage break-down and which exerts pressure on said work film to force the work film against said wheel over at least the length of said arc, means for revolving said die wheel and advancing said work, and a high frequency generator coupled between said electrodes for producing a high frequency electric field therebetween and through said work film during the entire time said work film is advancing, said pattern being irregular and adapted to contact said work film, said apparatus including means for introducing a plurality of work parts between said electrodes, said pattern on said wheel including spaced pockets on the peripheral surface thereof, and pressure differential communicating with said pockets for selectively displacing areas on that one work part which is in contact with said wheel relative to other areas on said one work part, the heat produced by said field being of sufficient intensity to heat seal said work parts together selectively around said pockets.

18. Dielectric heating apparatus for heating a work film to plasticity and sealing the same to another superimposed film during the feeding of said work, comprising a die wheel having a metallic peripheral surface upon which there is a pattern, said peripheral surface constituting one electrode of said apparatus, another electrode spaced from and extending over a substantial arc on said peripheral surface, the spacing between said electrodes being sufficient to permit the inserting of said work therebetween, said other electrode generally conforming to the circular contour of said wheel, a buffer web of thermal insulation of high temperature strength and high voltage break-down and which exerts pressure on said work film to force the work film against said wheel over at least the length of said arc, means for revolving said die wheel and advancing said work, and a high frequency generator coupled between said electrodes for producing a high frequency electric field therebetween and through said work film during the entire time said work film is advancing, said pattern being irregular and adapted to contact said work film, said apparatus including means for introducing a plurality of work parts between said electrodes, said pattern on said wheel including spaced pockets on the peripheral surface thereof, and pressure differential means communicating with said pockets for selectively displacing areas on that one work part which is in contact with said wheel relative to other areas on said one work part, the heat produced by said field being of sufficient intensity to heat seal said work parts together selectively around said pockets, and means for cooling said work parts under pressure after said parts have advanced out of said high frequency field.

19. Dielectric heating apparatus as defined in claim 5, including means for introducing into said displaced areas a material to be contained before said work parts are sealed together.

20. Dielectric heating apparatus for heating a dielectric work, means for continuously advancing said work comprising a pair of electrodes, one of said electrodes being stationary said electrodes spaced from each other to permit the insertion of said work therebetween, a high frequency generator coupled between said electrodes for producing a high frequency electric field therebetween of sufficient intensity to heat the work to plasticity, means for exerting pressure on the work and for impressing a pattern having high and low elevations in said work during the time said work is upon and continuously advancing between said electrodes, and means for cooling said work under pressure while solely in the areas of said impressed pattern after the work has been heated.

21. Dielectric heating apparatus for heating a dielectric work, means for continuously advancing said work comprising a pair of electrodes, said electrodes spaced from each other to permit the insertion of said work therebetween, a high frequency generator coupled between said electrodes for producing a high frequency electric field therebetween of sufficient intensity to heat the work to plasticity, means for exerting pressure on the work and for impressing a pattern having high and low elevations in said work during the time said work is upon and continuously between said electrodes, and means for cooling said work under pressure while solely in the areas of said impressed pattern after the work has been heated, said dielectric heating apparatus including means for gradually building up the electric field intensity in said work before the pattern is impressed into said work.

22. Dielectric heating apparatus for heating a work to plasticity during the feeding of said work, comprising a die wheel having a metallic peripheral surface upon which there is a pattern having areas of different heights, said peripheral surface constituting one electrode of said apparatus, another electrode which is stationary and spaced from and extending over a substantial arc on said peripheral surface, the spacing between said electrodes being sufficient to permit the insertion of said work therebetween, said other electrode generally conforming to the circular contour of said wheel, a buffer web of thermal insulation of high temperature strength and high voltage breakdown and which is under tension to cause it to exert pressure on said work to force the work against said wheel over at least the length of said arc, means for revolving said die wheel and advancing said work, and a high frequency generator coupled between said electrodes for producing a high frequency electric field therebetween and through said work during the entire time said work is advancing over said die wheel, the characteristics of said web of insulation being such that they are unaltered when said work is heated to plasticity, and means for cooling said work after said work has passed beyond said arc and is no longer being heated by said electric field.

23. Dielectric heating apparatus for heat sealing together two superimposed dielectric work parts, comprising a die drum having a metallic peripheral surface in which there are spaced pockets, another electrode spaced from and extending over a substantial arc of said peripheral surface, the spacing between said electrodes being sufficient to permit the insertion of a plurality of work parts therebetween, a pressure differential means communicating with said pockets for selectively displacing areas of one work part above said pockets from other areas of said same one work part, means for feeding said work parts in superimposed relation over said peripheral surface and between said surface and said other electrode, means for exerting pressure on said work parts to force them against said peripheral surface over the length of said arc, and a high frequency source of power coupled between said peripheral surface and said other electrode for creating a high frequency electric field therebetween for selectively sealing said work parts together at points around said displaced areas.

24. Dielectric heating apparatus for heat sealing together superimposed dielectric work parts, comprising a die drum having a metallic peripheral surface in which there are spaced pockets, another electrode spaced from and extending over a substantial arc of said peripheral surface, the spacing between said electrodes being sufficient to permit the insertion of a plurality of work parts therebetween, a pressure differential means communicating with said pockets one at a time but successively for selectively displacing areas on one work part above said pockets from other areas of said same one work part, means for feeding said work parts in superimposed relation over said peripheral surface and between said surface and said other electrode, means for exerting pressure on said work parts to force them against said peripheral surface over the length of said arc, and a high frequency source of power coupled between said peripheral surface and said other electrode for creating a high frequency electric field therebetween for selectively sealing said work parts together at points around said displaced areas.

25. Dielectric heating apparatus as defined in claim 9, including means for regularly and periodically producing a distributed capacity in selected areas on said peripheral surface which selected areas are appreciably smaller than the whole area of said surface and at locations on which wheel where it is desired to regulate the amount of available voltage used to heat the work film to plasticity.

26. Dielectric heating apparatus for heating a work to plasticity during the feeding of the work, comprising a die wheel having a peripheral surface along the longitudinal dimension thereof upon which there are different patterns having elevated and recessed surfaces, a plurality of electrodes spaced from one another along the longitudinal dimension of said peripheral surface and occupying different arcuate portions of said wheel on which there are respectively different patterns, said plurality of electrodes being spaced from said wheel to permit the insertion of said work between then and said surface, means exerting pressure on said work to force it against said patterns, means for revolving said wheel and advancing said work, and means for simultaneously producing at any one instant regularly and periodically different high frequency electric fields between said wheel and each of said plurality of electrodes and through said work during the time said work is advancing.

References Cited by the Examiner
UNITED STATES PATENTS

| | | | |
|---|---|---|---|
| 2,510,750 | 6/50 | Marquardt | 156—277 XR |
| 2,621,704 | 12/52 | Langer | 156—311 XR |
| 2,667,437 | 1/54 | Zoubek | 156—273 |
| 2,766,362 | 10/56 | Kinder et al. | |
| 2,788,838 | 4/57 | Crabbe et al. | 156—380 |
| 2,838,894 | 6/58 | Paikens et al. | 53—79 |
| 2,940,230 | 6/60 | Flax | 53—39 |
| 2,978,008 | 4/61 | Conti | 156—285 |
| 3,074,117 | 1/63 | Carpenter et al. | 156—272 |
| 3,118,041 | 1/64 | Young | 156—272 |

EARL M. BERGERT, *Primary Examiner.*

CARL F. KRAFFT, *Examiner.*